(12) United States Patent
Ikematsu et al.

(10) Patent No.: US 7,927,494 B2
(45) Date of Patent: Apr. 19, 2011

(54) WATER REUSE METHOD IN CLEANING DEVICE

(75) Inventors: Mineo Ikematsu, Ibaraki (JP);
Kazuhiro Kaneda, Saitama (JP);
Tomohito Koizumi, Gunma (JP);
Masahiro Iseki, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 493 days.

(21) Appl. No.: 12/003,106

(22) Filed: Dec. 20, 2007

(65) Prior Publication Data
US 2008/0148784 A1 Jun. 26, 2008

(30) Foreign Application Priority Data
Dec. 21, 2006 (JP) .................... 2006-344056

(51) Int. Cl.
*C02F 1/42* (2006.01)
(52) U.S. Cl. ........ 210/681; 210/683; 210/690; 210/691; 210/692
(58) Field of Classification Search .............. 210/681, 210/683, 690–692, 670
See application file for complete search history.

(56) References Cited

U.S. PATENT DOCUMENTS

| 2,879,839 | A | * | 3/1959 | Carpenter et al. | ........... 159/47.1 |
| 5,732,362 | A | * | 3/1998 | Izumida et al. | .................... 588/2 |
| 6,103,100 | A | * | 8/2000 | Hart | ................................ 208/47 |

FOREIGN PATENT DOCUMENTS

| JP | 05-68965 | 3/1993 |
| JP | 05-212374 | 8/1993 |
| JP | 06-047189 | 2/1994 |

OTHER PUBLICATIONS

Chinese Office Action, with English translation, issued in Chinese Patent Application No. 200710199866.X, mailed Jan. 29, 2010.

* cited by examiner

*Primary Examiner* — Chester T Barry
(74) *Attorney, Agent, or Firm* — McDermott Will & Emery LLP

(57) ABSTRACT

There disclosed a water reuse method in which a surfactant is easily removed from surfactant-including for-treatment water in a cleaning device, whereby water can be reused, and an adsorbent can easily be regenerated only by exposing the adsorbent to an electrolytic solution, and a washing machine including the function. The method includes a surfactant adsorption treatment step of performing a treatment to adsorb and remove a surfactant in surfactant-including for-treatment water such as cleaning water and rinse water used in a washing machine W by hydrotalcite as an anion exchanger or zeolite as a cation exchanger, and a water reuse step of using, in the washing machine W, the for-treatment water treated in the surfactant adsorption treatment step.

14 Claims, 6 Drawing Sheets

WATER REUSE METHOD IN CLEANING DEVICE

CLAIM OF PRIORITY

This application claims the benefit of Japanese Patent Application No. JP 2006-344056, filed on Dec. 21, 2006 the disclosure of which is incorporated herein by reference.

BACKGROUND OF THE INVENTION

1. Field of the Invention

The present invention relates to a water reuse method for removing a surfactant from for-treatment water (hereinafter "water to be treated" will be referred to as "for-treatment water") such as surfactant-including cleaning water and rinse water to reuse the treated for-treatment water in a cleaning device such as a washing machine, and it also relates to a washing machine.

2. Description of the Related Art

Heretofore, in a washing machine for use in washing clothes and the like, city water is received in a drum, a detergent is added to form cleaning water, and a cleaning operation of the clothes and the like is executed. In this cleaning operation, a surface tension of water is reduced with a surfactant included in the detergent, and the cleaning water is allowed to penetrate gaps of fibers of the clothes. Then, dirt components attached to the fibers are surrounded with the surfactant and drawn into the cleaning water. The dirt components attached to a hydrophobic group of the surfactant and drawn into the cleaning water are surrounded with surfactant molecules and solubilized, and hence the dirt components do not attach to the fibers again. After end of the cleaning operation, the cleaning water is discarded from the drum, and the city water is newly received as rinse water to execute a rinse operation. In consequence, the fibers are washed with a large amount of water, and the surfaces and inner parts of the fibers are brought into a clean state. Then, the rinse water used in the rinse operation is discarded from the drum in the same manner as in the cleaning water.

According to such a series of cleaning and rinse operations, a large amount of city water is used in the cleaning water and the rinse water and discarded. Therefore, it is demanded that the water for use in the cleaning and rinse operations should be saved to contribute to the environment. Heretofore, for example, a part of the rinse water has been used as the next cleaning water, and the water has been reused to save the water. In this case, the final rinse water for use in a subsequent stage of the rinse operation is once received in a storage tank, and used as the cleaning water in the next cleaning operation.

However, the water used as the cleaning water and the rinse water used in a previous stage of the rinse operation are still discarded, and hence it is difficult to realize remarkable water saving.

On the other hand, a method for removing the surfactant from surfactant-including for-treatment water, and a device are developed. For example, in a surfactant-including waste water treatment device disclosed in Patent Document 1, waste water is mixed with a granular activated carbon, and the surfactant is adsorbed by the activated carbon and removed from the waste water. Then, the waste water from which the surfactant has been removed is discharged to the outside as it is, and the activated carbon in which adsorbed surfactant is concentrated is discarded as the waste activated carbon.

On the other hand, in a surfactant removal device disclosed in Patent Document 2, the surfactant is adsorbed by the activated carbon from the surfactant-including waste water in the same manner as described above, the activated carbon having a deteriorated adsorption capability is subjected to an ozone treatment to desorb and decompose the surfactant, and the activated carbon is regenerated.

[Patent Document 1] Japanese Patent Application Laid-Open No. 5-68965

[Patent Document 2] Japanese Patent Application Laid-Open No. 5-212374

As described above, in the conventional surfactant removal device, activated carbon is used as means for removing the surfactant from the waste water. The adsorption capability of this activated carbon gradually deteriorates owing to the adsorption of the surfactant or the like, and hence a replacement operation with a new activated carbon or the regeneration of the activate carbon is required. In consideration of an impact on the environment, a regeneration treatment of the waste activated carbon which has adsorbed the surfactant is essential, but the regeneration treatment of the activated carbon requires a desorption and decomposing treatment with ozone as disclosed in Patent Document 2. However, the regeneration device of the activated carbon has a complicated mechanism, and has a problem that the activated carbon is consumed by oxidization decomposition.

SUMMARY OF THE INVENTION

The present invention has been developed in order to solve a conventional technical problem, and an object thereof is to provide a water reuse method in a cleaning device, characterized in that a surfactant-including for-treatment water is treated so as to easily remove a surfactant therefrom in the cleaning device, whereby the water can be reused, and in that an adsorption material can easily be regenerated only by exposing the adsorption material to an electrolytic solution.

Another object of the present invention is to provide a washing machine including the corresponding function.

A water reuse method in a cleaning device according to the present invention is characterized by comprising: a surfactant adsorption treatment step of performing a treatment to adsorb and remove a surfactant in surfactant-including for-treatment water used in the cleaning device by an anion exchanger or a cation exchanger; and a water reuse step of using, in the cleaning device, the for-treatment water treated in the surfactant adsorption treatment step.

The water reuse method in the cleaning device according to the invention of a second aspect is characterized in that in the above invention, the anion exchanger is hydrotalcite, an anion exchange resin, zirconium oxide, or a clay mineral configured to realize anion exchange.

The water reuse method in the cleaning device according to the invention of a third aspect is characterized in that in the above invention of the first aspect, the cation exchanger is zeolite, a cation exchange resin, or a clay mineral configured to realize cation exchange.

The water reuse method in the cleaning device according to the invention of a fourth aspect is characterized in that the above inventions include a regeneration treatment step of regenerating the anion exchanger or the cation exchanger which has adsorbed the surfactant in the for-treatment water by exposing the anion exchanger or the cation exchanger to an electrolytic solution.

The water reuse method in the cleaning device according to the invention of a fifth aspect is characterized in that the above inventions include a residual organic matter treatment step of adding hypochlorous acid, ozone or another active oxygen species to treat a residual organic matter in the for-treatment water treated in the surfactant adsorption treatment step, or treating the residual organic matter with electrolytic water produced by electrochemically treating the for-treatment water.

The water reuse method in the cleaning device according to the invention of a sixth aspect is characterized in that the above inventions include a cation adsorption treatment step of performing a treatment to adsorb and remove, by the cation exchanger, cations in the for-treatment water treated in the surfactant adsorption treatment step or the residual organic matter treatment step, in a case where a surfactant adsorbent is the anion exchanger.

The water reuse method in the cleaning device according to the invention of a seventh aspect is characterized in that the above inventions of the first to fifth aspects include an anion adsorption treatment step of performing a treatment to adsorb and remove, by the anion exchanger, anions in the for-treatment water treated in the surfactant adsorption treatment step or the residual organic matter treatment step, in a case where a surfactant adsorbent is the cation exchanger.

A water reuse method in a cleaning device according to the invention of an eighth aspect is characterized by comprising: a electrolytic surfactant treatment step of decomposing, by electrolysis, a surfactant in for-treatment water including the surfactant used in the cleaning device; and a water reuse step of using, in the cleaning device, the for-treatment water treated in the electrolytic surfactant treatment step.

A washing machine according to the invention of a ninth aspect executes a cleaning operation and a rinse operation of a laundry in a drum, and is characterized by comprising: an anion exchanger or a cation exchanger which performs a treatment to adsorb and remove a surfactant included in cleaning water and/or rinse water used in the cleaning operation and/or the rinse operation; and return means for returning, into the drum, the cleaning water and/or the rinse water from which the surfactant has been removed by the anion exchanger or the cation exchanger.

The washing machine according to the invention of a tenth aspect is characterized in that in the above invention, the anion exchanger is hydrotalcite, an anion exchange resin, zirconium oxide, or a clay mineral configured to realize anion exchange.

The washing machine according to the invention of an eleventh aspect is characterized in that in the above invention of the ninth aspect, the cation exchanger is zeolite, a cation exchange resin, or a clay mineral configured to realize cation exchange.

The washing machine according to the invention of a twelfth aspect is characterized in that the above inventions of the washing machine include regeneration treatment means for regeneration the anion exchanger or the cation exchanger by exposing the same to an electrolytic solution.

The washing machine according to the invention of a thirteenth aspect is characterized in that the above inventions of the washing machine include a storage tank to receive the cleaning water and/or the rinse water discharged from the drum, and conveyance means for conveying the cleaning water and/or the rinse water in the storage tank to the anion exchanger or the cation exchanger.

The washing machine according to the invention of a fourteenth aspect is characterized in that the inventions of the washing machine include residual organic matter treatment means for adding hypochlorous acid, ozone or another active oxygen species to the cleaning water and/or the rinse water, or electrolytic treatment means for treating the cleaning water and/or the rinse water with electrochemically produced electrolytic water.

The washing machine according to the invention of a fifteenth aspect is characterized in that the above inventions of the washing machine include the cation exchanger or the anion exchanger which performs a treatment to adsorb and remove cations or anions included in the cleaning water and/or the rinse water.

A washing machine according to the invention of a sixteenth aspect executes a cleaning operation and a rinse operation of a laundry in a drum, and is characterized by comprising: electrolytic surfactant treatment means for decomposing, by electrolysis, a surfactant included in cleaning water and/or rinse water used in the cleaning operation and/or the rinse operation; and return means for returning, into the drum, the cleaning water and/or the rinse water from which the surfactant has been removed by the electrolytic surfactant treatment means.

According to the present invention, the surfactant in the surfactant-including for-treatment water used in the cleaning device, for example, the cleaning water and/or the rinse water used in the cleaning operation and/or the rinse operation in the washing machine which executes the cleaning operation and the rinse operation of the laundry in the drum as in the ninth aspect is adsorbed and removed by the anion exchanger or the cation exchanger (the surfactant adsorption treatment step), and the treated for-treatment water is returned into the drum (the water reuse step), whereby the water used in the cleaning device is reused, so that water saving can effectively be realized.

Especially, in the for-treatment water including an anionically exchangeable surfactant, the surfactant is adsorbed and removed by the anion exchanger. In the for-treatment water including a cationically exchangeable surfactant, the surfactant is adsorbed and removed by the cation exchanger. Therefore, the surfactant can highly efficiently be removed from the for-treatment water, and even dirt components surrounded with the surfactant can be removed from the for-treatment water. Therefore, the water for reuse returned into the drum does not include any surfactant or dirt component, so that the next cleaning operation, rinse operation or the like can preferably be executed. Therefore, afterward, the amount of water to be supplied to the cleaning device can be minimized, and remarkable water saving can be realized as compared with a cleaning device such as a conventional washing machine. In consequence, it is possible to contribute to environment conservation, and water charges can largely be reduced.

Moreover, according to the second and tenth aspects, in the above inventions, the anion exchanger is hydrotalcite, the anion exchange resin, zirconium oxide, or the clay mineral configured to realize the anion exchange. Therefore, it is possible to easily realize the adsorption removal of the anionically exchangeable surfactant from the for-treatment water.

According to the inventions of the third and eleventh aspects, in the above inventions, the cation exchanger is zeolite, the cation exchange resin, or the clay mineral configured to realize the cation exchange. Therefore, it is possible to easily realize the adsorption removal of the cationically exchangeable surfactant from the for-treatment water.

Furthermore, according to the inventions of the fourth and twelfth aspects, in the above inventions, the anion exchanger or the cation exchanger which has adsorbed the surfactant in the for-treatment water is subjected to the regeneration treatment of exposing the anion exchanger or the cation exchanger to the electrolytic solution, whereby an adsorption capability of the anion exchanger or the cation exchanger can be restored.

In consequence, without using any complicated device, it is possible to easily realize the regeneration treatment of the anion exchanger or the cation exchanger which adsorbs the surfactant, so that the device can be simplified, the anion exchanger or the cation exchanger can repeatedly be used, a laborious exchange operation can be avoided, and operating cost required for component replacement can be reduced. The anion exchanger or the cation exchanger to be subjected to the discard process can be minimized, so that it is possible to contribute to the environment conservation.

Moreover, as in the invention of the washing machine of the thirteenth aspect, the washing machine includes the storage tank which receives the cleaning water and/or the rinse water discharged from the drum, and the conveyance means for conveying the cleaning water and/or the rinse water in the storage tank to the anion exchanger or the cation exchanger, whereby the cleaning water and the rinse water are discharged from the drum to the storage tank, and then the cleaning water and the rinse water in the storage tank are conveyed to the anion exchanger or the cation exchanger. In consequence, the water subjected to the adsorption treatment, the cleaning water which has not been treated yet and the like are mixed in the drum, whereby it is possible to avoid a disadvantage that the amount of the water to be subjected to the adsorption treatment increases in the anion exchanger or the cation exchanger.

In consequence, the surfactant included in the cleaning water and the rinse water can efficiently be subjected to the adsorption treatment by the anion exchanger or the cation exchanger, and removal efficiency of the surfactant from the cleaning water and the like can be improved.

According to the inventions of the fifth and fourteenth aspects, the above inventions include the residual organic matter treatment step of treating the for-treatment water treated in the surfactant adsorption treatment step by adding hypochlorous acid, ozone or the other active oxygen species, or treating the for-treatment water with the electrolytically produced water. In consequence, organic matters such as a detergent and dirt components remaining in the for-treatment water subjected to the adsorption treatment of the surfactant can be subjected to the decomposition treatment with hypochlorous acid, ozone or the other active oxygen species.

Therefore, it is possible to reduce the amount of the anion exchanger or the cation exchanger for use in the adsorption treatment of the surfactant, or the number of stages of the anion exchanger or the cation exchanger installed in a plurality of divided stages. Moreover, the for-treatment water once subjected to the adsorption treatment of the surfactant and the decomposition treatment with hypochlorous acid, ozone or the other active oxygen species is reused, and then subjected to the adsorption removal treatment again. In this case, an adsorption removal capability of the exchanger can be improved.

According to the inventions of the sixth and fifteenth aspects, the above inventions include the cation adsorption treatment step of performing the treatment to adsorb and remove, by the cation exchanger, the cations in the for-treatment water treated in the surfactant adsorption treatment step or the residual organic matter treatment step, in a case where the surfactant adsorbent is the anion exchanger, whereby it is possible to effectively remove the cations accumulated in the repeatedly used for-treatment water.

In consequence, cations such as metal ions are removed from the for-treatment water, whereby it is possible to effectively solve a disadvantage that a cleaning effect of the surfactant included in the detergent lowers.

Moreover, as in the seventh or fifteenth aspect, the invention includes the anion adsorption treatment step of performing the treatment to adsorb and remove, by the anion exchanger, the anions in the for-treatment water treated in the surfactant adsorption treatment step or the residual organic matter treatment step, in a case where the surfactant adsorbent is the cation exchanger, so that it is possible to effectively remove the anions accumulated in the repeatedly used for-treatment water.

According to the invention of the eighth aspect, the surfactant in the surfactant-including for-treatment water used in the cleaning device, for example, the cleaning water and/or the rinse water used in the cleaning operation and/or the rinse operation in the washing machine which executes the cleaning operation and the rinse operation of the laundry in the drum as in the sixteenth aspect is decomposed by the electrolysis (the electrolytic surfactant treatment step), and the treated for-treatment water is returned into the drum (the water reuse step). In this case, the water used in the cleaning device is reused, whereby the water saving can effectively be realized.

Especially, in the surfactant-including for-treatment water, the surfactant is subjected to the decomposition treatment by the electrolysis, whereby the surfactant can highly efficiently be removed from the for-treatment water, and even the dirt components surrounded with the surfactant can be removed from the for-treatment water. Therefore, the water for reuse returned into the drum does not include any surfactant or dirt component, so that the next cleaning operation, rinse operation and the like can preferably be executed. Therefore, afterward, the amount of the water to be supplied to the cleaning device can be minimized, and remarkable water saving can be realized as compared with a cleaning device such as a conventional washing machine. In consequence, it is possible to contribute to the environment conservation, and the water cost can largely be reduced.

DESCRIPTION OF THE PREFERRED EMBODIMENT

Figure 1:
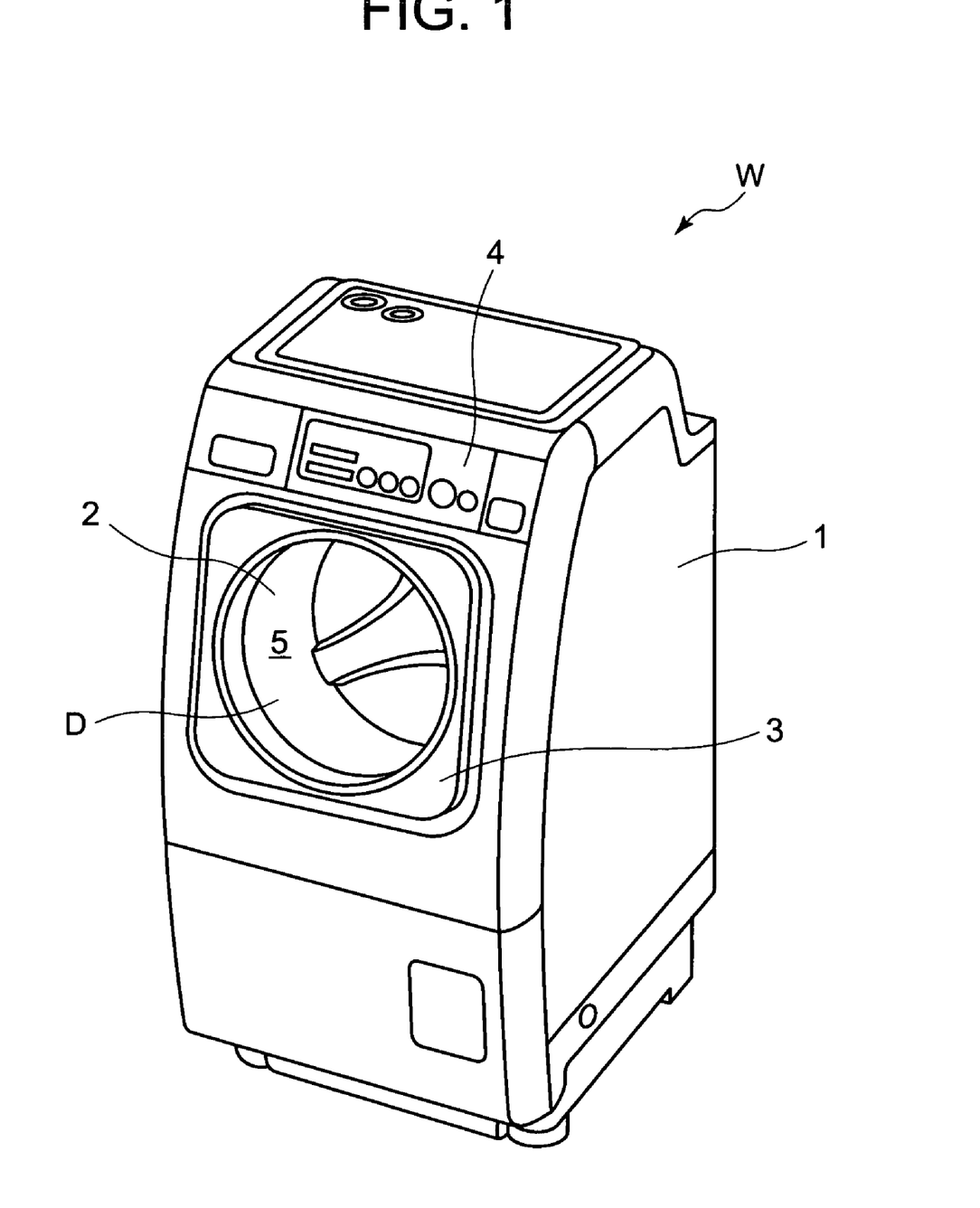
FIG. 1 is a perspective view of a washing machine as one embodiment of a cleaning device of the present invention.
Figure 2:
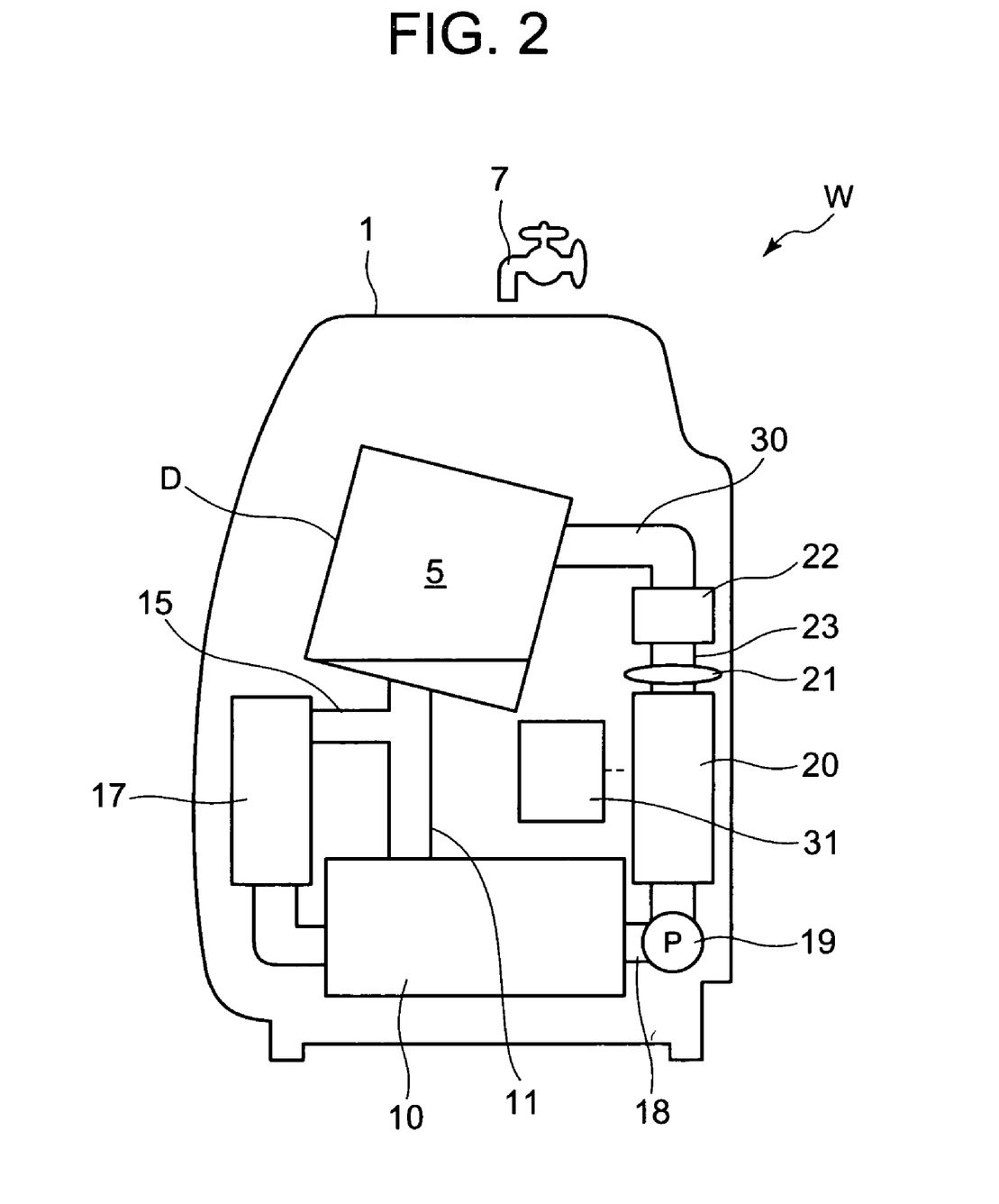
FIG. 2 is a schematic vertical side view of the washing machine of FIG. 1.

An embodiment of the present invention will hereinafter be described in detail with reference to the drawings. In the present embodiment, a washing machine W for use in washing clothes will be described as an example of a cleaning device. FIG. 1 shows a perspective view of the washing machine W to which the present invention has been applied, and FIG. 2 shows a schematic vertical side view of the washing machine W.

The washing machine W of the present embodiment is for use in washing a laundry such as clothes, and constituted of a main body 1 constituting an outer shell. An opening/closing door 3 for receiving the laundry is attached to a front surface of this main body 1. At an upper part of the front surface of the main body 1 positioned above the opening/closing door 3, an operation panel 4 provided with various operation switches and a display section is arranged.

In the main body 1, a drum main body D is provided which includes an outer drum (not shown) made of a resin and an inner drum 2 made of stainless steel, arranged on an inner side of this outer drum and serving as both a cleaning tub and a dewatering tub. Both of the outer drum and the inner drum 2 have a bottomed cylindrical shape, and are arranged so that an axis of a cylinder has an oblique direction extending from an upper front part to a lower rear part and so that an upper end opening has an obliquely upward direction toward the opening/closing door 3 provided in the main body 1. Moreover, the inside of the inner drum 2 is a storage chamber 5 in which the laundry is received, a rotary shaft (not shown) of the inner drum 2 is connected to a shaft of a driving motor 8 (shown only in FIG. 4) attached to the outer drum, and the inner drum 2 is held in the outer drum so as to be rotatable around the rotary shaft of the inner drum 2 connected to the motor shaft. Furthermore, the whole peripheral wall of the inner drum 2 is provided with a large number of through holes (not shown) through which air and water (for-treatment water) can be circulated.

Figure 4:
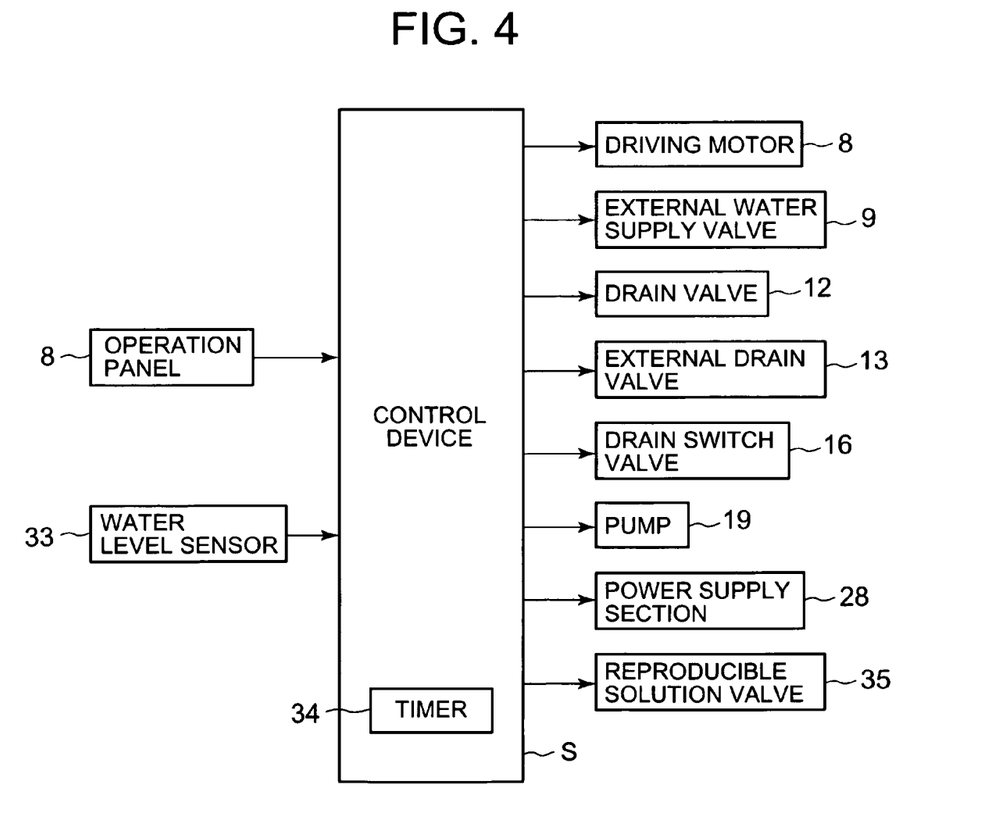
FIG. 4 is a block diagram of a control device of a washing machine of FIG. 1.

The above-mentioned driving motor 8 is a motor for rotating the inner drum 2 around the shaft during a cleaning operation and a rinse operation. It is to be noted that driving control of the driving motor 8 is executed by a control device S described later in detail. This driving motor 8 is attached to the other end of the shaft (an inner side of FIG. 1).

An upper part of the main body 1 is provided with an external water supply passage (not shown), and one end of this external water supply passage is connected to a water supply source 7 as external water supply means for supplying city water into the inner drum 2 via an external water supply valve 9 (shown only in FIG. 4). This external water supply valve 9 is controlled to open and close by the control device S.

Moreover, the other end of the external water supply passage is connected to the outer drum to communicate with the inside of the drum. It is constituted that when the external water supply valve 9 is opened by the control device S, the water (the city water) is supplied from the external water supply source 7 into the storage chamber 5 of the inner drum 2 provided in the outer drum.

Furthermore, a lower part of the main body 1 is provided with a storage tank 10 for receiving for-treatment water such as cleaning water and rinse water used in the storage chamber 5, and the storage tank 10 is connected to one end of a drain passage 11 connected to the lower part of the outer drum. One end of this drain passage 11 is connected to a drain valve 12 controlled to open and close by the control device S, and the for-treatment water in the storage chamber 5 is discharged to the storage tank 10 via the drain valve 12. It is to be noted that the lowermost part of this storage tank 10 is provided with an external drain port as external drain means, an external drain valve 13 is interposed at the external drain port, and a drain hose (not shown) is connected as an external drain path to be derived to the outside. In consequence, the external drain valve 13 is controlled to open and close by the control device S, whereby the for-treatment water in the storage tank 10 can be discharged from the tank.

In the present embodiment, the drain passage 11 which connects the storage tank 10 to the outer drum is provided with a bypass passage 15, and a drain switch valve (shown only in FIG. 4) 16 controlled by the control device S is interposed at a connecting portion between this bypass passage 15 and the drain passage 11. Then, it is assumed in the present embodiment that a detergent for use includes a general anionic surfactant, a cation removal device 17 is interposed along this bypass passage 15, and an end of the cation removal device 17 positioned on a downstream side is connected to the storage tank 10.

This cation removal device 17 is filled with zeolite as a cation exchanger, and cations (e.g., $Na^+$, $Ca^{2+}$, $Mg^{2+}$, etc.) included in the for-treatment water passed through the cation removal device 17 are adsorbed and removed by zeolite. It is to be noted that in the present embodiment, zeolite is used as the cation exchanger, but the present invention is not limited to this embodiment, and examples of the cation exchanger may include a cation exchange resin, a clay mineral such as vermiculite capable of realizing cation exchange, smectite such as montmorillonite and bentonite, allophone and imogolite. In consequence, the adsorption removal of the cations in the for-treatment water can easily be realized.

The storage tank 10 is connected to one end of a conveyance passage 18 provided with a pump 19 as conveyance means, the detergent for use in the present embodiment includes the general anionic surfactant as described above, and hence the other end of the conveyance passage 18 is connected to an anion removal device 20. This anion removal device 20 is filled with hydrotalcite as an anion exchanger, and anions such as the surfactant included in the for-treatment water to be passed through the anion removal device 20 are adsorbed and removed by hydrotalcite. It is to be noted that in the present embodiment, hydrotalcite is used as the anion exchanger, but the present invention is not limited to this embodiment, and examples of the anion exchanger may include an anion exchange resin, zirconium oxide and a clay mineral capable of realizing anion exchange, for example, kaoline such as kaolinite, dichite, nakhlite and halloysite, allophane and imogolite. In consequence, the adsorption removal of the anionic surfactant from the for-treatment water can easily be realized.

Then, a downstream side of this anion removal device 20 is connected to an electrolytic treatment device 22 and an external drain passage (not shown) having one externally derived end via a conveyance passage 23. It is to be noted that it is assumed that the external drain passage is provided with an external drain valve (not shown). In the present embodiment, powdered hydrotalcite is used as the anion exchanger, and hence an outlet part of the conveyance passage 23, the external drain passage or the anion removal device 20 is provided with a finely porous thin film 21 as separation means for separating hydrotalcite and the for-treatment water. It is to be noted that in the present embodiment, the finely porous thin film 21 is used as the separation means, but the present invention is not limited to this embodiment, and a filter provided with holes smaller than grain diameters of at least hydrotalcite, centrifugal separation means, a sedimentation tank or the like may be used. It is to be noted that when the centrifugal separation means is used, power of the driving motor 8 for use in rotating and driving the inner drum 2 may be used.

Figure 3:
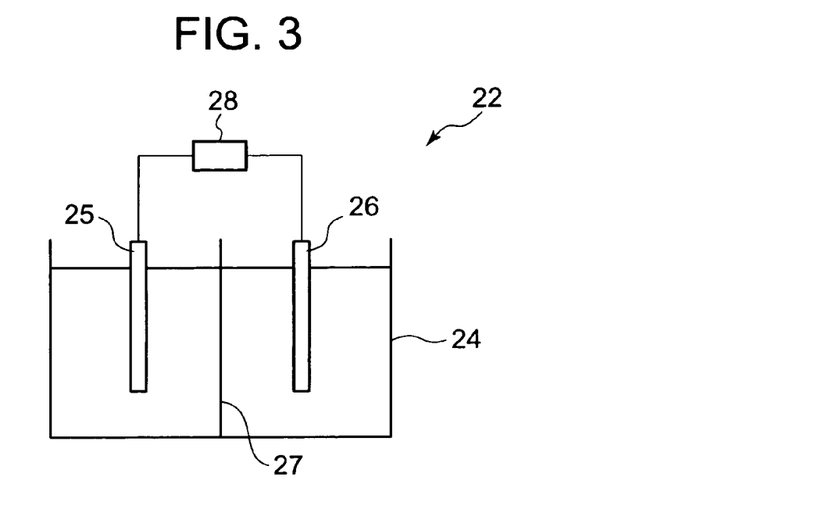
FIG. 3 is a schematic constitution diagram of an electrolytic treatment device of FIG. 2.

As shown in a schematic constitution diagram of FIG. 3, the electrolytic treatment device 22 includes an electrolytic tank 24 provided with an inflow port and an outflow port (not shown), and in the electrolytic tank 24, at least a pair of electrodes for electrolysis (an anode 25 and a cathode 26) are disposed at least a part of which is immersed in a state where the for-treatment water is received therein. It is to be noted that a cation exchange film 27 may be disposed via which these anode 25 and cathode 26 sides are separated. The anode 25 and the cathode 26 are connected to a power supply section 28 connected to the control device S via wires (not shown), respectively, and power supply to the anode 25 and the cathode 26 is controlled by the control device S.

The anode 25 is constituted of, for example, a metal oxide of ruthenium (Ru) and niobium (Nb) or a metal oxide of platinum (Pt) and tantalum (Ta) capable of easily producing ozone as active oxygen species by electrolysis. The cathode 26 is constituted of a platinum (Pt). For example, a Nafion (trade name) film is used as a cation oxide exchange film. In consequence, in addition to a method in which a treatment is performed only on the anode 25 side, the for-treatment water is passed from the anode 25 side to the cathode 26 side, whereby improvement of a treatment capability can be expected. It is to be noted that in the present embodiment, it is constituted that the for-treatment water supplied from the anion removal device 20 is subjected to an electrolytic treatment in the electrolytic treatment device 22, whereby ozone is produced in the for-treatment water to perform an ozone treatment, but an ozone treatment method is not limited to the method, and ozone may be added separately by ozone addition means to perform the ozone treatment. The method is not limited to the ozone treatment, and the treatment may be performed with other active oxygen species such as hypochlorous acid and hydrogen peroxide solution.

Then, the outflow port of this electrolytic treatment device 22 is connected to a return water passage 30. The other end of the return water passage 30 is connected to the inner drum 2 in the same manner as in the external water supply passage. It is to be noted that in the present embodiment, return means is constituted by including not only the return water passage 30 but also the pump 19. This electrolytic treatment device 22 may be provided with an external drain passage having one externally derived end, and it is assumed that the external drain passage is provided with an external drain valve (not shown).

Moreover, in the present embodiment, the washing machine W includes a regeneration solution adding device 31 in which an electrolytic solution such as salt water is stored as regeneration treatment means, and the reproducible solution adding device 31 is connected to the anion removal device 20 via a regeneration solution valve 35 (shown only in FIG. 4).

Next, the control device S will be described with reference to an electric block diagram of the control device S of FIG. 4. The control device S is constituted of a general-purpose microcomputer, and a timer 34 as timing means is embedded. An input side of this control device S is connected to each switch provided on the operation panel 4, a water level sensor 33 which detects a water level in the inner drum 2 and the like. On the other hand, an output side thereof is connected to the driving motor 8, the external water supply valve 9, the drain valve 12, the external drain valve 13, the drain switch valve 16, the reproducible solution valve 35, the pump 19, the power supply section 28 and the like.

Next, an operation of the washing machine W having the above-mentioned constitution will be described. First, the opening/closing door 3 is opened, and a laundry and a detergent having an amount corresponding that of the laundry are introduced into the storage chamber 5 of the inner drum 2. Then, a power switch and a start switch among the switches provided on the above-mentioned operation panel 4 are operated, whereby the control device S starts the cleaning operation.

In this cleaning operation, the control device S opens the external water supply valve 9 to open an external water supply passage (not shown), or operates the pump 19. In consequence, water is supplied from the external water supply source 7 or the return water passage 30 into the storage chamber 5 of the inner drum 2 in the outer drum. It is to be noted that at this time, it is assumed that the drain valve 12 of the drain passage is closed by the control device S. To supply the water into the storage chamber 5, it is assumed that the supply of the water from the return water passage 30 is preferentially performed. It is assumed that when a water level in the storage chamber 5 does not satisfy a predetermined water level according to an output of the water level sensor 33, the external water supply valve 9 is opened, and water is supplementarily supplied from the external water supply source 7. Therefore, when the water cannot completely be supplied from the return water passage 30, that is, when the cleaning operation is first performed immediately after installation, all the water is supplied from the external water supply source 7.

When a predetermined amount of water is received in the storage chamber 5 of the inner drum 2 by the above water supply control, the control device S stops the operation of the pump 19, and closes the external water supply valve 9 to block the external water supply passage. In consequence, the supply of the water from one of the water supply sources (the storage tank 10 or the external water supply source 7 supplied via the return water passage 30) is stopped.

Next, the control device S energizes and starts up the driving motor 8 formed at the side surface of the main body 1, and rotates the shaft, whereby the inner drum 2 attached to the shaft starts rotating in the outer drum to start the cleaning operation.

(Cleaning Operation)

In this cleaning operation, the detergent including the anionic surfactant is added to the water (hereinafter referred to as the cleaning water) received in the storage chamber 5, whereby a surface tension of the cleaning water is reduced by the surfactant, and the cleaning water penetrates gaps among fibers of a laundry such as clothes. Then, dirt components attached to the fibers are surrounded with the surfactant, and the dirt components are taken into the cleaning water. The dirt components attached to a hydrophobic group of the surfactant and taken into the cleaning water are surrounded with surfactant molecules and solubilized, and hence do not attach to the fibers again. Moreover, cations such as sodium ions derived from sweat attached to the clothes or the like are eluted in the cleaning water.

With an elapse of a predetermined time after the start of the cleaning operation, the control device S stops the driving motor 8, and opens the drain valve 12 of the drain passage 11. In consequence, the water in the storage chamber 5 of the inner drum 2 (i.e., the cleaning water in the outer drum) is discharged into the storage tank 10 via the drain passage 11. At this time, it is assumed that the drain switch valve 16 provided along the drain passage 11 is switched by the control device S so as to communicate with the storage tank 10, and the external drain valve 13 connected to a drain hose derived to the outside is blocked.

(Dewatering Operating)

Then, when the cleaning water in the storage chamber 5 of the inner drum 2 is discharged into the storage tank 10, the control device S shifts from the cleaning operation to a dewatering operation. In this dewatering operation, while maintaining a state in which the drain valve 12 of the drain passage 11 opened at the end of the cleaning operation is opened, the control device S operates the driving motor 8 again, and dewaters the laundry in the storage chamber 5 of the inner drum 2. The control device S executes this dewatering for a predetermined time, then closes the drain valve 12 of the drain passage 11, and ends the dewatering operation. It is to be noted that in the subsequent stage of the dewatering operation or after the end of the dewatering operation, the control device S successively executes the following surfactant adsorption treatment step and ozone treatment step.

(Surfactant Adsorption Treatment Step)

In this surfactant adsorption treatment step, the control device S operates the pump 19, and the cleaning water in the storage tank 10 is conveyed to the anion removal device 20 via the conveyance passage 18. In consequence, the cleaning water which has flowed into the anion removal device 20 comes in contact with hydrotalcite as the anion exchanger, whereby the anionic surfactant included in the cleaning water is adsorbed and removed by hydrotalcite. Here, the surfactant to be adsorbed and removed is not limited to a unitary surfactant, and includes a surfactant which surrounds the dirt components. It is to be noted that an adsorption removal capability of the surfactant by this hydrotalcite will be described later in an experimental result.

Then, in the anion removal device 20, the cleaning water from which the surfactant has been subjected to the adsorption removal treatment is conveyed to the electrolytic treatment device 22 via the conveyance passage 23. It is to be noted that the anion exchanger for use in the present embodiment is powdered hydrotalcite. Therefore, the anion exchanger is subjected to a filter treatment in the finely porous thin film 21 as the separation means, and then conveyed to the electrolytic tank 24 of the electrolytic treatment device 22. In consequence, hydrotalcite which has come in contact with the cleaning water remains in the anion removal device 20.

(Residual Organic Matter Treatment Step)

Next, the control device S shifts from the surfactant adsorption treatment step to the residual organic matter treatment step. In the residual organic matter treatment step, the control device S energizes the respective electrodes for electrolysis (between the anode 25 and the cathode 26) by the power supply section 28 of the electrolytic treatment device 22. In consequence, a voltage is applied to the anode 25 and the cathode 26 to subject the cleaning water received in the electrolytic tank 24 to an electrolytic decomposition treatment.

On the other hand, in the cathode 26, chlorine, or ozone produced in the anode 25 is reduced to chloride ions or oxygen or water. That is, a reaction reverse to a chemical reaction in the anode 25 occurs.

However, in the present embodiment, the cation exchange film 27 is interposed between the anode 25 and the cathode 26 compartment, so that the cations can permeate through the cation exchange film 27, and permeation of the anions and permeation of a dissolved gas can be suppressed. Therefore, chlorine and ozone produced in the anode 25 cannot permeate through the cation exchange film 27 nor move to the cathode 26. In consequence, the reduction of chlorine and ozone produced in the anode 25 side by the cathode 26 is inhibited, whereby residential time of ozone in the cleaning water can be lengthened.

Therefore, organic matters such as the detergent and the dirt components remaining in the cleaning water subjected to the adsorption treatment of the surfactant can be decomposed by the produced ozone. It is to be noted that an effect of the execution of the residual organic matter treatment step in the subsequent stage of such a surfactant adsorption treatment step will be described later in the experiment result. Moreover, in the present embodiment, as means for the residual organic matter treatment, a method is employed in which the cleaning water is directly subjected to the electrolytic treatment to produce electrolytic water including active oxygen species such as ozone, but the present invention is not limited to this embodiment, and the ozone (active oxygen species) addition means for adding gas-phase ozone (or hypochlorous acid, other activate oxygen species) to the cleaning water may separately be disposed, whereby residual organic matters such as the detergent and the dirt components remaining in the cleaning water may be subjected to the decomposition treatment.

(Rinse Operation)

Next, the control device S shifts to a rinse operation, the surfactant in the cleaning water is subjected to the adsorption treatment, and the for-treatment water after the cleaning water has been subjected to the residual organic matter treatment is supplied as the rinse water into the storage chamber 5 of the inner drum 2 via the return water passage 30. Therefore, afterward, the performed cleaning operation and rinse operation are reuse steps (a water reuse step) of the cleaning water or the rinse water used in the previous operations. It is to be noted that in the same manner as in the supply of the cleaning water, to supply the water into the storage chamber 5, the supply of the water from the return water passage 30 is preferentially performed. When the water level in the storage chamber 5 does not satisfy a predetermined water level according to an output of the water level sensor 33, the external water supply valve 9 is opened to supplementarily supply the water from the external water supply source 7. When a predetermined amount of the water is supplied to the storage chamber 5 in the inner drum 2 in this manner, the control device S closes the external water supply valve 9 to block the water supply passage. In consequence, the supply of the water from the water supply source 7 is stopped.

Then, a rotating operation of the driving motor 8 is repeated for a predetermined time to rinse the laundry in the storage chamber 5. In consequence, the cleaning water which has penetrated the surface of the laundry, the gaps of the fibers and the like is rinsed with a large amount of rinse water. Therefore, the detergent and dirt attached to the laundry are eluted in the rinse water.

The control device S operates the driving motor 8 for a predetermined time, then stops the driving motor 8, opens the drain valve 12 of the drain passage 11, discharges the water to the storage tank 10 via the drain passage 11, and ends the rinse operation. Then, the control device S discharges the rinse water from the storage chamber 5, then operates the driving motor 8 again, and rotates the inner drum 2 in the same manner as described above to execute the dewatering operation for dewatering the laundry.

Then, the rinse water received in the storage tank 10 is also subjected to the surfactant adsorption treatment step and the residual organic matter treatment step in the same manner as in the cleaning water. The respective treatment steps are executed, whereby the surfactant and the dirt components eluted in the rinse water are removed, and the treated rinse water is supplied as new rinse water into the storage chamber 5 of the inner drum 2 via the return water passage 30 for use in the second rinse operation.

In the second rinse operation, the control device S operates the driving motor 8 for a predetermined time, then stops the driving motor 8, opens the drain valve 12 of the drain passage 11, switches the drain switch valve 16 in such a direction as to communicate with the cation removal device 17, sends the rinse water in the storage chamber 5 to the cation removal device 17 via the drain passage 11 and the bypass passage 15, and executes a cation adsorption treatment step. It is to be noted that the control device S discharges the rinse water from the storage chamber 5, then operates the driving motor 8 again, rotates the inner drum 2 in the same manner as described above, and executes the dewatering operation for dewatering the laundry.

(Cation Adsorption Treatment Step)

This cation removal device 17 is filled with zeolite as the cation exchanger as described above, and hence the cations accumulated in the rinse water are subjected to adsorption removal by zeolite. In consequence, the cations accumulated in the for-treatment water repeatedly used as the cleaning water and the rinse water can effectively be removed to soften the water. Therefore, cations such as magnesium ions and calcium ions are deposited in the for-treatment water, whereby it is possible to effectively solve a disadvantage that the cleaning effect of the surfactant included in the detergent lowers.

Afterward, the rinse water passed through the cation removal device 17 is discharged to the storage tank 10 via the bypass passage 15. The rinse water received in this storage tank 10 is beforehand stored in the storage tank 10 in order to use the water as the cleaning water in the next cleaning operation, thereby ending a series of washing operations. At the end of such a series of washing operations, the control device S operates the pump 19 for a predetermined time, executes the residual organic matter treatment (from a viewpoint of a structure, when the water cannot directly be conveyed to the electrolytic treatment device 22, the treatment may be executed after performing the surfactant adsorption treatment) of a part of the rinse water in the storage tank 10, and returns the ozone-including rinse water to the storage tank 10 by the return means (not shown), whereby propagation of miscellaneous bacteria in the storage tank 10 may be suppressed by a sterilizing power of ozone.

It is to be noted that in the present embodiment, the rinse operation is performed twice, but the present invention is not limited to this embodiment, and the operation may be performed only once or repeated three times or more. In the present embodiment, as described above, all the rinse water is discharged to the storage tank 10 between the rinse operations, the dewatering operation is executed, and the rinse water in the storage tank 10 is subjected to the surfactant adsorption treatment and the residual organic matter treatment and then supplied into the storage chamber 5 of the inner drum 2, but the present invention is not limited to this embodiment. That is, during the rinse operation, each predetermined amount of the rinse water in the storage chamber 5 of the inner drum 2 is discharged to the storage tank 10, subjected to the surfactant adsorption treatment and the residual organic matter treatment, and then supplied as the new rinse water into the storage chamber 5 of the inner drum 2, whereby the surfactant adsorption treatment and the residual organic matter treatment of the rinse water in the storage chamber 5 may successively be executed to lower a concentration of the surfactant eluted in the rinse water to a predetermined concentration or less.

Moreover, in the above embodiment, after the end of the cleaning operation, the dewatering operation is performed, and then the rinse operation is executed, but the present invention is not limited to this embodiment. The cleaning operation is performed for a predetermined time, and then each predetermined amount of the cleaning water in the storage chamber 5 of the inner drum 2 is discharged to the storage tank 10, subjected to the surfactant adsorption treatment and the residual organic matter treatment and then supplied as the rinse water into the storage chamber 5 of the inner drum 2, whereby the surfactant adsorption treatment and the residual organic matter treatment of the cleaning water in the storage chamber 5 may successively be executed to lower the concentration of the surfactant eluted in the cleaning water to a predetermined concentration or less.

In addition, as in the above embodiment, for-treatment water such as the cleaning water or the rinse water in the storage chamber 5 of the inner drum 2 is discharged to the storage tank 10, and then the cleaning water or the rinse water in the storage tank 10 is conveyed to the anion removal device 20, whereby the treated water, the cleaning water which has not been treated yet and the like are mixed in the storage chamber 5. In consequence, it is possible to avoid a disadvantage that the amount of the water to be treated in the anion removal device 20 or the like increases.

Therefore, the anionic surfactant included in the cleaning water and the rinse water can efficiently be treated by the anion removal device 20 and the electrolytic treatment device 22, and removal efficiency of the surfactant from the cleaning water or the like can be improved.

In any of the above cases, it is assumed that the rinse water discharged from the storage chamber 5 of the inner drum 2 just before the end of a series of washing operations is passed through the cation removal device 17, and then received in the storage tank 10 by the control device S.

In consequence, the cleaning water or the rinse water used in the cleaning operation or the rinse operation is subjected to the adsorption removal treatment of the anionic surfactant by the anion exchanger in the anion removal device 20. Therefore, the water can be returned into the storage chamber 5 of the inner drum 2, and reused as the cleaning water or the rinse water in the cleaning operation or the rinse operation again, whereby effective water saving can be realized.

Especially, the anionic surfactant is adsorbed and removed by hydrotalcite as the anion exchanger from for-treatment water such as the cleaning water and the rinse water including the surfactant, whereby the anionic surfactant can highly efficiently be removed from the for-treatment water. Moreover, even the surfactant including the dirt components surrounded with the surfactant can be removed from the for-treatment water. Therefore, the water returned into the storage chamber 5 of the inner drum 2 does not include any surfactant or dirt component, so that the next cleaning operation, rinse operation and the like can preferably be executed. Therefore, the amount of the water to be newly supplied to the washing machine W can be minimized, and remarkable water saving can be realized as compared with a cleaning device such as a conventional washing machine. In consequence, it is possible to contribute to environment conservation, and water charges can largely be reduced.

It is to be noted that the surfactant adsorption treatment steps to be executed in the cleaning operation and the rinse operation are performed a plurality of times, whereby an adsorption capability of hydrotalcite as the anion exchanger lowers. Therefore, a series of washing operations are performed, for example, about five or six times in order to regenerate hydrotalcite, and then the operation switch provided on the operation panel 4 is operated, whereby the control device S executes a regeneration treatment step.

(Regeneration Treatment Step)

In the regeneration treatment step, the control device S supplies a predetermined amount, for example, about 1 L or 2 L of predetermined salt water (a salt solution as an electrolytic solution) from the regeneration solution adding device 31 to the anion removal device 20. In consequence, the salt water is passed through hydrotalcite as the anion exchanger to be introduced into the anion removal device 20, whereby the surfactant and the like adsorbed by hydrotalcite are replaced with chloride ions to regenerate hydrotalcite. The control device S opens the external drain valve to discard the salt water (including the surfactant, etc.) used in a regeneration treatment from the external drain passage via the finely porous thin film 21.

In consequence, without using any complicated device, the anion exchanger (hydrotalcite in the present embodiment) which adsorbs the anionic surfactant can easily be regenerated to restore the adsorption capability, so that the device can be simplified. Moreover, the anion exchanger can repeatedly be used, any laborious exchange operation can be avoided, and operating cost required for component replacement can be reduced. Furthermore, the anion exchanger to be subjected to the discard treatment can be reduced, so that the contribution to the environment conservation can be realized.

In the above constitution, the surfactant replaced with the chloride ions in the salt water is eluted in the salt water as much as an amount of the surfactant previously subjected to the adsorption treatment. Therefore, in the regeneration treatment step, the salt water including a large amount of surfactant which has flowed out of the anion removal device 20 is sent to the electrolytic treatment device 22 via the finely porous thin film as the separation means, and the control device S performs the electrolytic treatment in the electrolytic treatment device 22, and may then discard the water to the outside via the external drain passage connected to the electrolytic treatment device 22.

In consequence, the surfactant included in the salt water and the like are subjected to the decomposition treatment by hypochlorous acid, ozone or other active oxygen species generated in the electrolytic treatment device 22 or added hypochlorous acid, ozone and other active oxygen species to lower the concentration of the surfactant, and can be discarded from the device in this state. Therefore, an impact on the environment can be reduced, and it is possible to further contribute to environment protection.

It is to be noted that in the above embodiment, it has been described that the surfactant included in the detergent is a general anionic surfactant, but the present invention is not limited to this embodiment, and when the surfactant included in the detergent is a cationic surfactant, it is assumed that the anion removal device 20 of the above embodiment turns to the cation removal device and that the device is filled with a cation exchanger similar to that for use in the above cation removal device 17. Moreover, it is assumed that the cation removal device 17 turns to the anion removal device and that the device is filled with an anion exchanger similar to that for use in the above anion removal device 20.

In consequence, in the surfactant adsorption treatment step, the cleaning water which has flowed into the cation removal device comes in contact with zeolite as the cation exchanger, whereby the cationic surfactant included in the cleaning water is adsorbed and removed by zeolite. Therefore, the cationic surfactant included in the cleaning water and the rinse water can efficiently be treated by the cation removal device and the electrolytic treatment device 22, and removal efficiency of the surfactant from the cleaning water and the like can be improved. Therefore, even in such a case, the water can be returned into the storage chamber 5 of the inner drum 2, and reused as the cleaning water or the rinse water in the cleaning operation or the rinse operation again, and effective water saving can be realized.

It is to be noted that in this case, the cation adsorption treatment step of the above embodiment turns to an anion adsorption treatment step by the anion removal device, and the adsorption removal of the anions accumulated in the rinse water is performed by hydrotalcite as the anion exchanger. In consequence, the anions deposited in the for-treatment water repeatedly used as the cleaning water and the rinse water can effectively be removed.

It is to be noted that in the electrolytic treatment of the for-treatment water in the electrolytic treatment device 22 (surfactant electrolytic treatment means), for example, diamond electrodes are used as the electrodes for electrolysis, and a high voltage is applied, whereby highly concentrated ozone can be produced. Therefore, after the end of the cleaning operation and the rinse operation, the surfactant-containing cleaning water and rinse water are conveyed to the electrolytic treatment device, and the surfactant, the dirt components and the like may be subjected to the decomposition treatment (a surfactant electrolytic treatment step) by highly concentrated ozone, and the water may be reused (a water reuse step) as the cleaning water and rinse water for use in the subsequent operation.

Even in this case, the cleaning water or the rinse water used in the cleaning operation or the rinse operation is subjected to the decomposition treatment of the surfactant by the electrolysis in the electrolytic treatment device 22, so that the water is returned into the storage chamber 5 of the inner drum 2, and can be reused as the cleaning water or the rinse water in the cleaning operation or the rinse operation again, and effective water saving can be realized.

Especially, the surfactant is decomposed and removed by highly concentrated ozone or the like produced by the electrolytic treatment from for-treatment water such as the surfactant-including cleaning water and rinse water, whereby the surfactant can highly efficiently be removed from the for-treatment water. Moreover, even the surfactant including the dirt components surrounded with the surfactant can be removed from the for-treatment water. Therefore, the water returned into the storage chamber 5 of the inner drum 2 does not include any surfactant or dirt components, so that the next cleaning operation and rinse operation and the like can preferably be executed. In consequence, the amount of the water to be newly supplied to the washing machine W can be minimized, and remarkable water saving can be realized as compared with a cleaning device such as the conventional washing machine. Therefore, it is possible to contribute to the environment conservation, and the water charges can largely be reduced.

Even in this case, in order to suppress the accumulation of the anions and cations included in repeatedly used for-treatment water such as the cleaning water and the rinse water, the anion exchanger and the cation exchanger may be disposed to perform the respective adsorption removal treatments of the ions.

Next, there will be described experimental results concerning the adsorption capability of hydrotalcite as the anion exchanger, an effect of the electrolytic treatment accompanying the adsorption treatment and a regeneration of hydrotalcite with reference to FIGS. 5 to 7.

Figure 5:
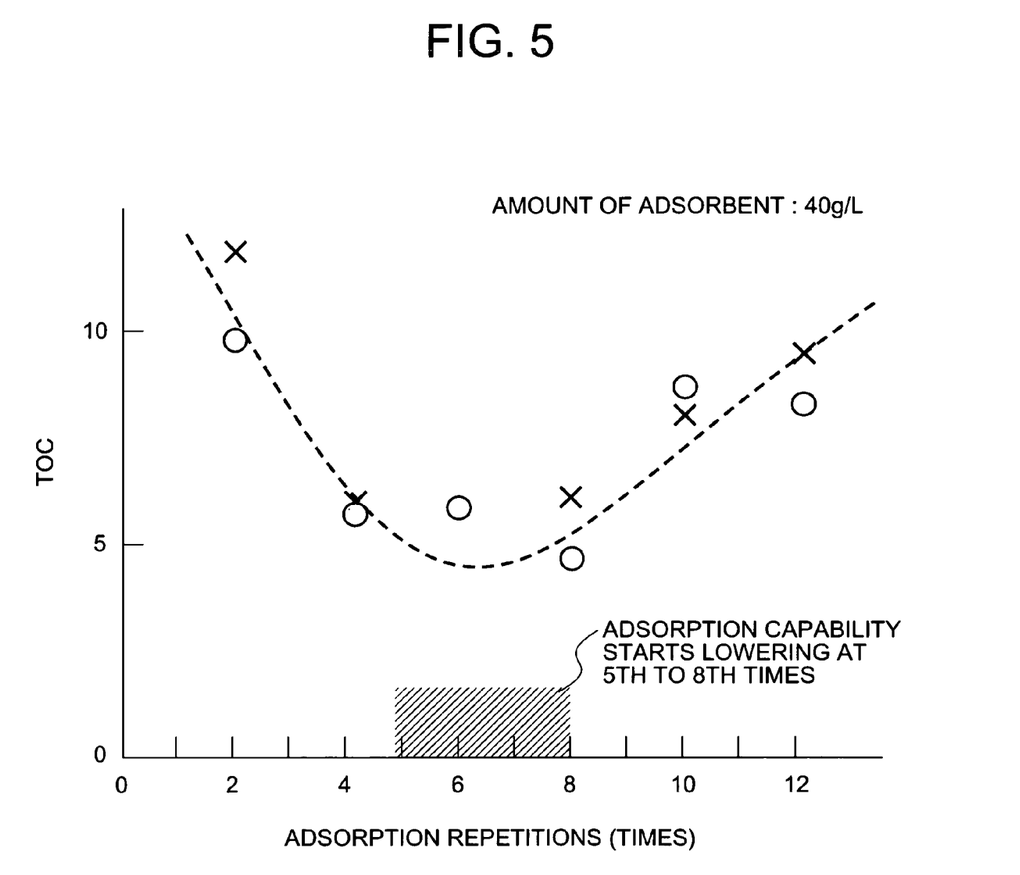
FIG. 5 is a diagram showing an experimental result concerning a change of an adsorption capability with respect to the number of times of adsorption with hydrotalcite.

FIG. 5 shows a result of an experiment conducted concerning a change of the adsorption capability with respect to the number of times of adsorption by hydrotalcite. In the experiment, five artificially contaminated cloths (wet artificially contaminated cloths: Washing science Association, Japan) were put in 1 L of model tap water (standard water), stirred at room temperature for 20 minutes, and then removed to prepare the for-treatment water. Then, 0.04 g of hydrotalcite and 1 mL of for-treatment water adjusted as described above were added to a 1.5 mL micro test tube, vortex-mixed, and then subjected to a centrifugal separation treatment at 12000 rpm for 30 seconds. Afterward, a supernatant was subjected to a filtration by a filter with 0.2 μm pore size to obtain an adsorption treatment solution. It is to be noted that the experimental result of the adsorption treatment performed a plurality of times was obtained by repeating the above-mentioned operation by use of the same hydrotalcite. Then, a total organic carbon (TOC) as an index of contamination of the resultant adsorption treatment solutions was measured using TOC-$V_{CPN}$ (Shimadzu Corporation, Japan).

In such an experiment, the solutions subjected to the adsorption treatment twice, four times, six times, eight times, ten times and twelve times, respectively, were subjected to the measurement of TOC. The ordinate of the graph of FIG. 5 indicates the TOC, and the abscissa indicates the number of the adsorption treatments by the same hydrotalcite. According to this graph, the solution subjected to the adsorption treatment twice had a TOC of about 10 or a slightly higher degree. The solutions subjected to the adsorption treatment four times, six times and eight times had a TOC of about 6. Furthermore, the solution subjected to the adsorption treatment ten times had a TOC of about 8, and the solution subjected to the adsorption treatment twelve times had a TOC of about 9.

According to this result, it is seen that the adsorption capability of the total organic carbon is higher in a case where the adsorption treatment is performed repeatedly as much as a predetermined number of times, for example, four to eight times than a case where the number of the adsorption times is about two. Even in a case where the adsorption treatment is performed repeatedly, when the adsorption treatment is performed ten times or more, the adsorption capability of hydrotalcite tends to lower.

Therefore, it has been confirmed that the adsorption capability indicating a high TOC removal can be obtained by using a predetermined amount of hydrotalcite or arranging hydrotalcite in a plurality of divided stages.

Figure 6:
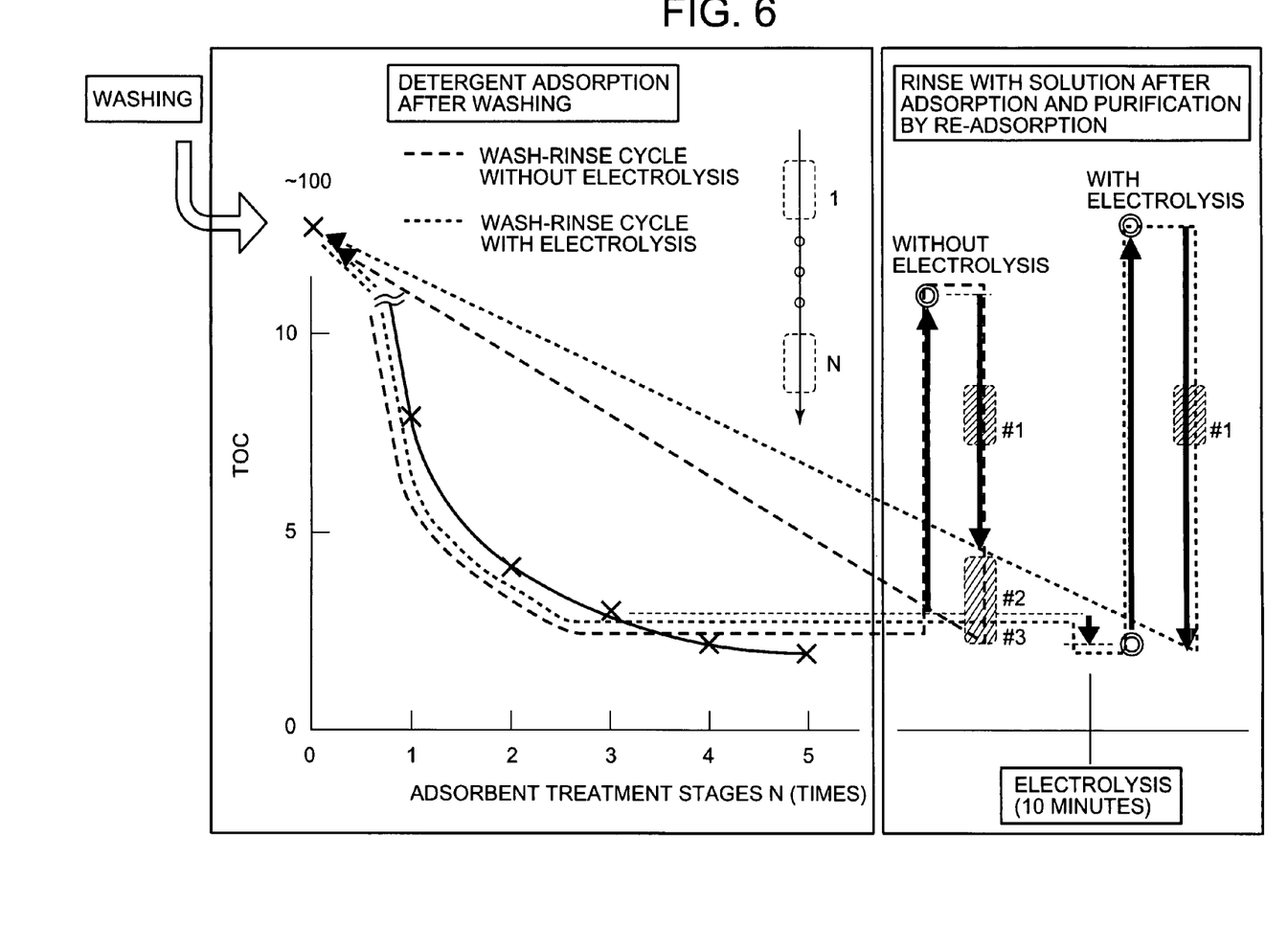
FIG. 6 is a diagram showing an experimental result concerning dependence of the number of hydrotalcite adsorption stages on total organic carbon (TOC) and variation of an adsorption capability of hydrotalcite by an ozone treatment.

FIG. 6 shows a result of an experiment conducted concerning dependence of the number of hydrotalcite adsorption stages on total organic carbon (TOC) and variation an adsorption capability of hydrotalcite by an ozone treatment. In the experiment, 2 g of hydrotalcite and 50 mL of cleaning solution were added to a 50 mL centrifugation tube, vortex-mixed, and then subjected to the centrifugal separation treatment at 3000 rpm for 30 seconds. Afterward, the supernatant was subjected to the filtration by the 0.2 μm pore size filter to obtain an adsorption treatment solution.

Then, hydrotalcite which had not been subjected to the adsorption treatment was added again to the resultant adsorption treatment solution, and the adsorption treatment was performed in the same manner as described above to obtain the adsorption treatment solution subjected to the adsorption treatment of two stages. This was repeated to obtain the adsorption treatment solutions up to the solution subjected to the adsorption treatment of five stages in the present experiment. Then, the total organic carbon (TOC) of the resultant adsorption treatment solutions was measured using TOC-$V_{CPN}$ (Shimadzu Corporation).

The ordinate of the left graph of FIG. 6 indicates the TOC, and the abscissa indicates the number of the stages of the adsorption treatments by hydrotalcite which has not been subjected to the adsorption treatment yet. According to this graph, the TOC of cleaning water having a TOC of around 100 at a time when the adsorption was not performed lowers to about 7.5 owing to the performed adsorption treatment of one stage, and lowers to about 4 owing to the adsorption treatment of two stages. Furthermore, the adsorption treatment of three stages is performed to lower the TOC to about 3, the adsorption treatment of four stages is performed to lower the TOC to about 2, and further the adsorption treatment of five stages is performed to lower the TOC to about 1.8.

In consequence, it can be said that the adsorption treatment by hydrotalcite can be performed in a plurality of divided stages, whereby the TOC can effectively be lowered.

On the other hand, in this experiment, 80 mL of adsorption treatment solution subjected to the adsorption treatment of three stages was subjected to the ozone treatment step of the above embodiment and used as the rinse water on one hand, and was used as the rinse water without being subjected to the ozone treatment step on the other hand. It is to be noted that the ozone treatment step electrolytically treats the water by use of the electrodes at a constant current of 160 mA for ten minutes.

In this experiment, one cleaned artificially contaminated cloth cleaned during the preparation of the for-treatment water was put in 80 mL of each of the above adsorption treatment solutions, stirred at room temperature for 20 minutes, and then removed to obtain the rinse water. The rinse water was subjected to the adsorption treatment by hydrotalcite in the same manner as in the above experiment, and the experimental result is shown in the right graph of FIG. 6.

The ordinate of the right graph similarly indicates a TOC. According to this graph, the TOC of the adsorption treatment solution used as the rinse water without being subjected to the ozone treatment step is about 12 as the rinse water before the adsorption treatment, but lowers to about 4 owing to the performed adsorption treatment of one stage, and lowers to about 3 owing to the performed adsorption treatment of two stages. Furthermore, the adsorption treatment of three stages is performed, whereby the TOC lowers to about 3 which is lower than the TOC of the cleaning water subjected to the adsorption treatment of three stages.

According to this experiment, it can be confirmed that even when the adsorption treatment solution is repeatedly used as the rinse water, the removal treatment of the TOC can effectively be performed.

On the other hand, it is seen that the TOC of the adsorption treatment solution used as the rinse water subjected to the ozone treatment step is about 14 as the rinse water before the adsorption treatment, but largely lowers to about 3 owing to the performed adsorption treatment of one stage.

In consequence, it is seen that the for-treatment water is subjected to the adsorption treatment of the surfactant and the decomposition treatment with ozone, then reused, and then subjected to the adsorption removal treatment again, whereby the adsorption capability of hydrotalcite can be increased as a whole. Therefore, the ozone treatment step is used together, whereby in the ozone treatment step, organic matters such as the detergent and dirt components remaining in for-treatment water such as the cleaning water and rinse water subjected to the surfactant adsorption treatment-step are subjected to the decomposition treatment. In consequence, the amount of the anion exchanger for use in the adsorption treatment of the surfactant or the number of the stages of the anion exchangers installed in a plurality of divided stages can be reduced.

Figure 7:
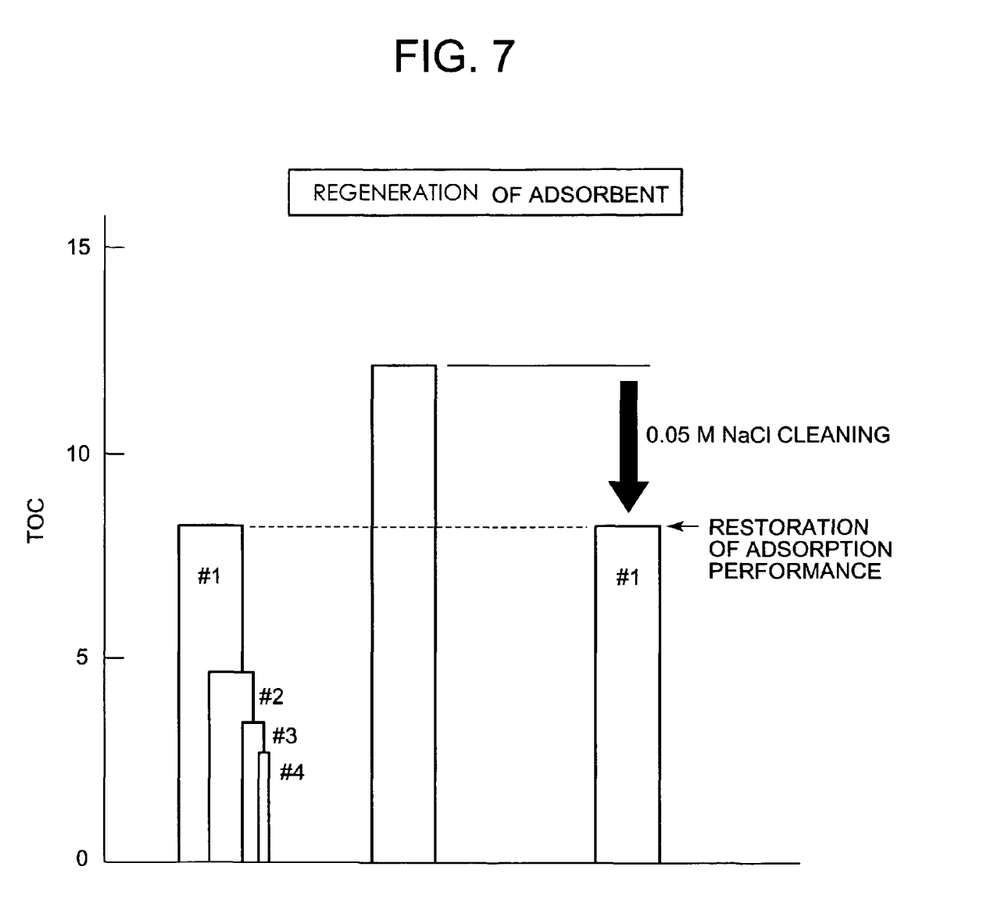
FIG. 7 is a diagram showing an experimental result concerning a regeneration of hydrotalcite adsorption capability.

On the other hand, FIG. 7 shows a result of an experiment performed concerning a regeneration of adsorption capability of hydrotalcite. In the experiment, an operation to obtain the adsorption treatment solution was repeatedly performed in the same manner as in the experiment of FIG. 5 to obtain an adsorption saturated state of hydrotalcite. The adsorption saturated hydrotalcite was subjected to a centrifugal separation to obtain pellets. Afterward, NaCl of 0.05 M was added as a regeneration solution to the pellets of hydrotalcite, vortex-mixed, and subjected to the centrifugal separation operation again to obtain pellets. The pellets were subjected to a similar adsorbing operation with cleaning water similar to that for use in the above experiment to obtain the supernatant, that is, the adsorption treatment solution.

The ordinate of the graph of FIG. 7 indicates a TOC, the abscissa indicates the number of adsorption times by the same hydrotalcite, and the adsorption treatment is performed after the regeneration treatment. According to this graph, the TOC after the adsorption treatment was performed once was about 8, the TOC after the adsorption treatment was performed twice was about 4.5, the TOC after the adsorption treatment was performed three times was about 3.5, and the TOC after the adsorption treatment was performed four times was about 3. Afterward, the adsorption treatment was repeated a plurality of times, and the TOC after the adsorption treatment by the hydrotalcite which has been adsorption saturated was about 12. In the adsorption saturated state, hydrotalcite was subjected to the regeneration treatment with NaCl, whereby the TOC after the adsorption treatment of the cleaning water with the regenerated hydrotalcite was about 8. This is a result similar to that in a case where the adsorption treatment is performed once in an unused state.

In consequence, it has been confirmed that hydrotalcite can be regenerated with a salt solution such as the salt water and that the adsorption capability can effectively be restored.

It is to be noted that in the embodiment, the present invention is applied to the washing machine W having an only washing function, but the present invention is not limited to this embodiment, and a similar effect is produced even in a washing machine having a drying function as well as a washing function, and a cleaning device such as a dishwasher.

What is claimed is:

1. A water reuse method in a cleaning device, the method comprising:
    a washing step for generating surfactant-including for-treatment water in the cleaning device;
    a surfactant adsorption treatment step of performing, in the cleaning device, a treatment to adsorb and remove a surfactant in the surfactant-including for-treatment water used in the cleaning device by an anion exchanger or a cation exchanger; and
    a water reuse step of using, in a cleaning operation in the cleaning device, the for-treatment water treated in the surfactant adsorption treatment step.

2. The water reuse method in the cleaning device according to claim 1, wherein the anion exchanger is hydrotalcite, an anion exchange resin, zirconium oxide, or a clay mineral configured to realize anion exchange.

3. The water reuse method in the cleaning device according to claim 1, wherein the cation exchanger is zeolite, a cation exchange resin, or a clay mineral configured to realize cation exchange.

4. The water reuse method in the cleaning device according to any one of claims 1 to 3, further comprising:
    a regeneration treatment step of regenerating the anion exchanger or the cation exchanger which has adsorbed the surfactant in the for-treatment water by exposing the anion exchanger or the cation exchanger to an electrolytic solution.

5. The water reuse method in the cleaning device according to any one of claims 1 to 3, further comprising:
    a residual organic matter treatment step of adding hypochlorous acid, ozone or other active oxygen species to treat a residual organic matter in the for-treatment water treated in the surfactant adsorption treatment step, or treating the residual organic matter with electrolytic water produced by electrochemically treating the for-treatment water.

6. The water reuse method in the cleaning device according to any one of claims 1 to 3, further comprising:
    a cation adsorption treatment step of performing a treatment to adsorb and remove, by the cation exchanger, cations in the for-treatment water treated in the surfactant adsorption treatment step, in a case where a surfactant adsorbent is the anion exchanger.

7. The water reuse method in the cleaning device according to any one of claims 1 to 3, further comprising:
    an anion adsorption treatment step of performing a treatment to adsorb and remove, by the anion exchanger, anions in the for-treatment water treated in the surfactant adsorption treatment step, in a case where a surfactant adsorbent is the cation exchanger.

8. The water reuse method in the cleaning device according to claim 4, further comprising:
    a residual organic matter treatment step of adding hypochlorous acid, ozone or other active oxygen species to treat a residual organic matter in the for-treatment water treated in the surfactant adsorption treatment step, or treating the residual organic matter with electrolytic water produced by electrochemically treating the for-treatment water.

9. The water reuse method in the cleaning device according to claim 4, further comprising:
    a cation adsorption treatment step of performing a treatment to adsorb and remove, by the cation exchanger, cations in the for-treatment water treated in the surfactant adsorption treatment step, in a case where a surfactant adsorbent is the anion exchanger.

10. The water reuse method in the cleaning device according to claim 5, further comprising:
    a cation adsorption treatment step of performing a treatment to adsorb and remove, by the cation exchanger, cations in the for-treatment water treated in the surfactant adsorption treatment step or the residual organic matter treatment step, in a case where a surfactant adsorbent is the anion exchanger.

11. The water reuse method in the cleaning device according to claim 8, further comprising:
    a cation adsorption treatment step of performing a treatment to adsorb and remove, by the cation exchanger, cations in the for-treatment water treated in the surfactant adsorption treatment step or the residual organic matter treatment step, in a case where a surfactant adsorbent is the anion exchanger.

12. The water reuse method in the cleaning device according to claim 4, further comprising:
    an anion adsorption treatment step of performing a treatment to adsorb and remove, by the anion exchanger, anions in the for-treatment water treated in the surfactant adsorption treatment step, in a case where a surfactant adsorbent is the cation exchanger.

13. The water reuse method in the cleaning device according to claim 5, further comprising:
    an anion adsorption treatment step of performing a treatment to adsorb and remove, by the anion exchanger, anions in the for-treatment water treated in the surfactant adsorption treatment step or the residual organic matter treatment step, in a case where a surfactant adsorbent is the cation exchanger.

14. The water reuse method in the cleaning device according to claim 8, further comprising:
    an anion adsorption treatment step of performing a treatment to adsorb and remove, by the anion exchanger, anions in the for-treatment water treated in the surfactant adsorption treatment step or the residual organic matter treatment step, in a case where a surfactant adsorbent is the cation exchanger.

* * * * *